United States Patent
Ko et al.

(10) Patent No.: US 9,110,333 B2
(45) Date of Patent: *Aug. 18, 2015

(54) BACKLIGHT UNIT AND DISPLAY DEVICE USING THE SAME

(71) Applicant: LG Innotek Co., Ltd., Seoul (KR)

(72) Inventors: Se Jin Ko, Seoul (KR); Ji In Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,697

(22) Filed: Jul. 18, 2014

(65) Prior Publication Data

US 2014/0328059 A1 Nov. 6, 2014

Related U.S. Application Data

(63) Continuation of application No. 14/097,444, filed on Dec. 5, 2013, now Pat. No. 8,814,417, which is a continuation of application No. 13/363,052, filed on Jan. 31, 2012, now Pat. No. 8,616,754.

(30) Foreign Application Priority Data

Jul. 29, 2011 (KR) .......................... 10-2011-0075995

(51) Int. Cl.
*F21V 7/04* (2006.01)
*G02F 1/1335* (2006.01)
*F21V 8/00* (2006.01)
*F21V 7/00* (2006.01)

(52) U.S. Cl.
CPC ............ *G02F 1/133615* (2013.01); *F21V 7/00* (2013.01); *F21V 7/0033* (2013.01); *F21V 7/04* (2013.01); *G02B 6/0031* (2013.01); *G02B 6/0055* (2013.01); *G02B 6/0096* (2013.01)

(58) Field of Classification Search
CPC ...................................... F21V 7/00; F21V 7/04
USPC .......... 362/602, 608, 609, 611, 612, 613, 97.1
See application file for complete search history.

(56) References Cited

U.S. PATENT DOCUMENTS

| | | |
|---|---|---|
| 5,008,658 A | 4/1991 | Russay et al. |
| 6,257,737 B1 | 7/2001 | Marshall et al. |
| 7,229,198 B2 | 6/2007 | Sakai et al. |
| 7,708,450 B2 | 5/2010 | Mikami |

(Continued)

FOREIGN PATENT DOCUMENTS

JP 2006-106212 A 4/2006

OTHER PUBLICATIONS

European Search Report dated Nov. 2, 2012 issued in Application No. 12 15 3286.

(Continued)

*Primary Examiner* — Ali Alavi
(74) *Attorney, Agent, or Firm* — Ked & Associates, LLP

(57) ABSTRACT

Disclosed is a backlight unit and a display device using the same, which includes a first reflector, a second reflector 300 and at least one light source module 100 disposed between the first and second reflectors, wherein a back surface of the first reflector comprises an inclined plane 201 and a flat surface 202, with facing the second reflector, and the inclined plane is adjacent to the light source and the flat surface is extended from an end of the inclined plane, with the inclined plane and the flat surface being collinear.

20 Claims, 20 Drawing Sheets

(56) References Cited

U.S. PATENT DOCUMENTS

| | | |
|---|---|---|
| 8,235,540 B2 | 8/2012 | Park et al. |
| 8,814,417 B2 * | 8/2014 | Ko et al. .................. 362/612 |
| 2005/0185394 A1 | 8/2005 | Sakamoto et al. |
| 2006/0274550 A1 | 12/2006 | Liu et al. |
| 2007/0014126 A1 | 1/2007 | Kuo et al. |
| 2007/0070623 A1 | 3/2007 | Laski |
| 2007/0171676 A1 | 7/2007 | Chang |

OTHER PUBLICATIONS

United States Notice of Allowance dated Aug. 30, 2013 issued in U.S. Appl. No. 13/363,052.
United States Notice of Allowance dated Apr. 23, 2014 issued in U.S. Appl. No. 14/097,444.
European Search Report dated Jan. 28, 2015 issued in Application No. 14188882.6.

* cited by examiner

Specular-reflection Region

BACKLIGHT UNIT AND DISPLAY DEVICE USING THE SAME

CROSS-REFERENCE TO RELATED APPLICATIONS

This application is a Continuation application of prior U.S. patent application Ser. No. 14/097,444 filed Dec. 5, 2013, which is a Continuation application of prior U.S. patent application Ser. No. 13/363,052 filed Jan. 31, 2012, which claims priority under 35 U.S.C. §119 to Korean Application No. 10-2011-0075995 filed on Jul. 29, 2011, whose entire disclosures are hereby incorporated by reference.

BACKGROUND

1. Field

Embodiments may relate to a backlight unit and a display device.

2. Background

Generally, a conventional display device may include a liquid crystal display (LCD), a plasma display panel (PDP) and the like.

Different from the PDP that is self-luminescent, the LCD is not self-luminescent and it requires a backlight unit as a self-luminescent.

Such a backlight unit used in the LCD may be categorized into an edge backlight unit and a direct backlight, based on location of a light source. In the edge type, light sources are disposed on right and left lateral surfaces or up and down lateral surfaces of an LCD panel. Light may be dispersed to a front surface by a light guide plate uniformly. Because of that, the edge backlight unit has good uniformity of light and it may enable the panel ultra-thin.

The direct backlight unit is used for a 20-inch-or-more display. In the direct backlight unit, light sources are disposed on a backside of a panel. Because of that, the direct backlight unit has an advantage of better luminous efficiency than the edge backlight unit and it is used for a large display requiring high brightness.

A cold cathode fluorescent lamp (CCFL) is used for the light source of the conventional edge backlight unit or the direct backlight unit.

However, an electric voltage is applied to the backlight unit using the CCFL constantly and the amount of used electricity is increased. The CCFL has a disadvantage of approximately 70% of color reproduction, compared with a cold cathode fluorescent lamp (CCFL) and another disadvantage of environmental pollution because of mercury added thereto.

To solve such disadvantages, there have been actively in progress studies on a backlight unit using a light emitting diode (LED) substituting for the CCFL.

In case of using the LED for the backlight unit, a partial on/off of LED arrays may be enabled and power consumption may be reduced remarkably. A RGB LED exceeds 100% of color production specifications of National Television System Committee (NTSC) and a more vivid image quality may be provided to a consumer.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Hereinafter, embodiments will be described with reference to the annexed drawings.

It will be understood that when an element is referred to as being 'on' or 'under' another element, it can be directly on/under the element, and one or more intervening elements may also be present.

When an element is referred to as being 'on' or 'under', 'under the element' as well as 'on the element' can be included based on the element.

Figure 1:
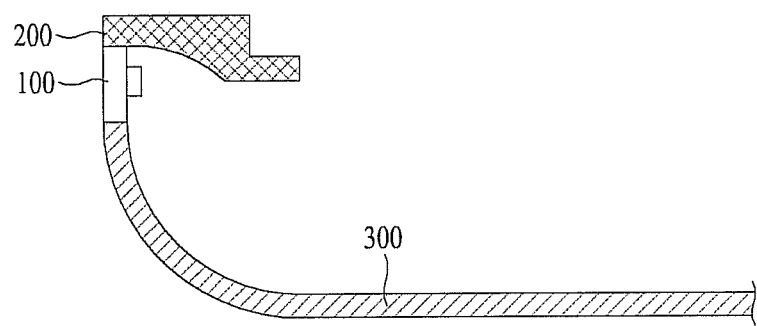
FIG. 1 is a sectional view illustrating a backlight unit according to an embodiment.

FIG. 1 is a sectional view illustrating a backlight unit according to an embodiment.

As shown in FIG. 1, the backlight unit may include a light source module 100, a first reflector 200 and a second reflector 300.

Here, the light source module 100 may be located between the first reflector 200 and the third reflector 300. Here, the light source module 100 may be adjacent to the first reflector 200.

In some cases, the light source module 100 may be spaced apart a predetermined distance from the second reflector 300, simultaneously in contact with the first reflector 200. Alternatively, the light source module 100 may be spaced apart a predetermined distance from the first reflector 200, simultaneously in contact with the second reflector 300.

Alternatively, the light module 100 may be spaced apart a predetermined distance from the first reflector 200 and the second reflector 300 or it may be in contact with the first reflector 200 and the second reflector 300.

The light source module 100 may include a substrate having an electrode pattern and at least one light source disposed on the substrate.

Here, the light source of the light source module 100 may be a top view type light emitting diode.

Alternatively, the light source may be a side view type light emitting diode.

The substrate may be a printed circuit board (PCB) formed of a selected material from polyethylene terephtalate (PET), glass, polycarbonate (PC) and silicon (Si), or the substrate may be a film.

Alternatively, the substrate may be a unilayered PCB, a multilayered PCB, a ceramic substrate or a metal core PCB selectively.

Here, a reflection coating film or a reflection coating material layer may be formed on the substrate and the substrate may reflect the light generated from the light source toward a central region of the second reflector 300.

The light source may be a light emitting diode (LED) chip and the light emitting diode chip may be configured of a blue LED chip, an ultraviolet light LED chip or it may be configured of a package combined with one or more of red, green, blue, yellow green and white LED chips.

The white LED may be realized by combining a yellow phosphor on the blue LED or combining a red phosphor and a green phosphor on the blue LED, or by using a yellow phosphor, a red phosphor and a green phosphor on the blue LED simultaneously.

Next, the first reflector 200 and the second reflector 300 may be facing each other, spaced apart a predetermined distance, to have air guide between them.

The first reflector 200 may be formed of a reflection coating film or a reflection coating material and it may reflect the light generated from the light source module 100 toward the second reflector 300.

Here, a back surface of the first reflector 200 may face the second reflector 300, with an inclined plane and a flat surface.

At this time, the inclined plane may be adjacent to the light source module 100 and the flat surface may be extended from an end of the inclined plane, with being located at the collinear position with respect to the light source module 100.

The inclined plane of the first reflector 200 may be inclined a predetermined angle downwardly from a top surface of the first reflector 200. The flat surface of the first reflector 200 may be in parallel to the top surface of the first reflector 200.

Here, the inclined plane of the first reflector may be a concave surface, a convex surface or a flat surface.

The reason why the predetermined area of the back surface disposed in the first reflector 200 may be the inclined plane is that a hot spot of a light-entry region, the size of the first reflector 200 can be reduced by the first reflector 200 reflecting the light toward the second reflector 300. Because of that, a bezel region may be reduced advantageously.

The inclined plane may be disposed in a predetermined region of the first reflector 200 and the first reflector 200 may include a metal material or a metal oxide, with a high reflectivity, such as aluminum (Al), silver (Ag), gold (Au) and titanium dioxide (TiO2).

A saw-toothed reflection pattern may be formed in a predetermined region of the back side of the first reflector 200.

Here, the reflection pattern may be a flat surface or a curved surface.

The reason why the reflection pattern is formed in the predetermined region of the first reflector 200 is that brightness may be increased in a central region of the backlight unit by reflecting the light generated from the light source module 100 toward the central region of the second reflector 300.

An inclined plane may be formed in a predetermined region of the second reflector 300 and the second reflector 300 may include a metal material or a metal oxide, with a high reflectivity, such as Al, Ag, Au and TiO2.

The inclined plane may be aligned with at least one of the light source module 100 and the first reflector 200.

Here, the inclined plane of the second reflector 300 may be inclined a predetermined angle with respect to the surface of the first reflector 200 and it may be at least one of concave, convex and flat surfaces.

In some cases, the second reflector 300 may include at least one inclined plane and at least one flat surface. The flat surface of the second reflector 300 may be in parallel to the flat surface of the first reflector 200.

Furthermore, the second reflector 300 may include at least two inclined planes with at least one inflection point. The curvatures of first and second inclined planes adjacent to each other with respect to the inflection point may be different from each other.

Figure 2A:
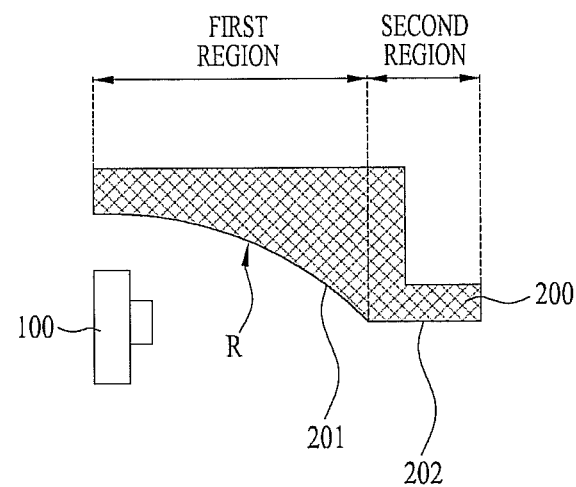
FIGS. 2A to 2C are sectional views illustrating a structure of a first reflector shown in FIG. 1.
Figure 2B:
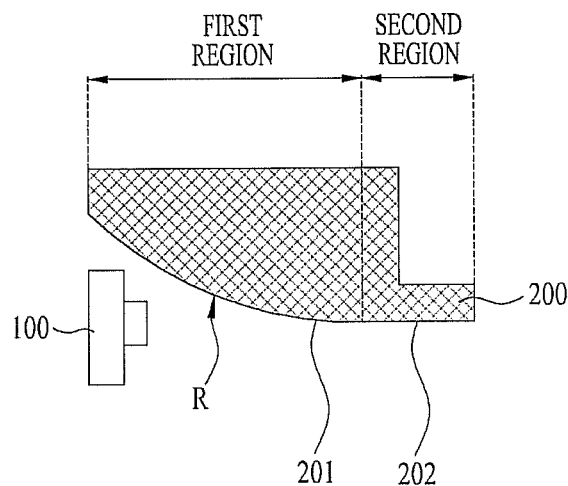
Figure 2C:
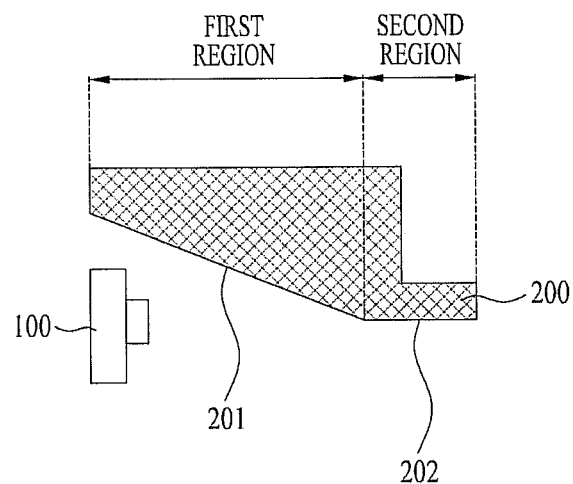

FIGS. 2A to 2C are sectional views illustrating the structure of the first reflector shown in FIG. 2.

As shown in FIGS. 2A to 2C, the back surface of the first reflector 200 may include a first region adjacent to the light source module 100 and a second region adjacent to the first region.

Here, the first region may be an inclined plane 201 and the second region may be a flat surface 202.

The inclined plane 201 of the first region may be inclined a predetermined angle along downward direction of the first reflector 200 and the flat surface 202 of the second region may be in parallel to the top surface of the first reflector 200.

At this time, the flat surface 202 of the second region may be extended from an end of the inclined plane 201, and the flat surface 202 and the light source module 100 may be collinear.

In case of FIG. 2A, the inclined plane 201 of the first reflector 200 may be a concave surface with a predetermined curvature.

In case of FIG. 2B, the inclined plane 201 of the first reflector 200 may be a convex surface with a predetermined curvature. In case of FIG. 2C, the inclined plane 201 of the first reflector 200 may be a flat surface with a predetermined inclined angle.

Figure 3:
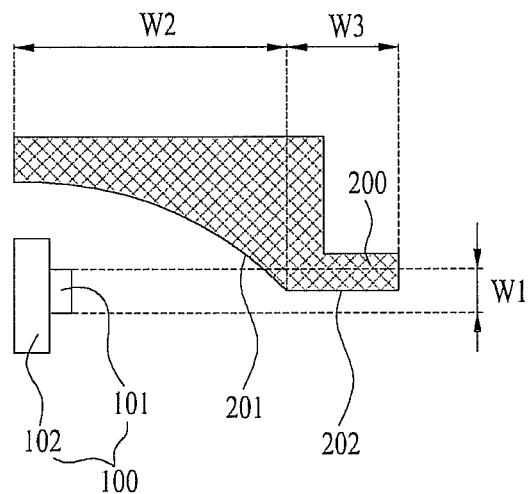
FIG. 3 is a sectional view illustrating a location of a flat surface of the first reflector.

FIG. 3 is a sectional view illustrating arrangement of the flat surface disposed in the first reflector.

As shown in FIG. 3, the light source module 100 may include a substrate 102 and at least one light source 101 disposed on the substrate 102.

Here, the light source 101 may have a top surface with a first width (W1) and the flat surface 202 of the first reflector 200 may be disposed in a center of the first width (W1) of the light source 101.

If the flat surface 202 of the first reflector 200 is disposed beyond the center (in an upper area) of the width (W1) of the light source 101, a hot spot may be generated in the light-entry region.

If the flat surface 202 of the first reflector 200 is disposed under the center of the first width (W1) (in a lower area of the width) of the light source 101, the light might be blocked or brightness might be degraded entirely.

As a result, if the flat surface 202 of the first reflector 200 is disposed within the first width (W1), the hot spot may be reduced in the light-entry region and the size of the first reflector 200 may be reduced. Because of that, the bezel region of the display panel may be reduced advantageously.

In addition, the inclined plane 201 of the first reflector 200 may have a second width (W2) and the flat surface 202 of the first reflector may have a third width (W3).

Here, the second width (W2) of the inclined plane 201 may be identical to or different from the third width (W3) of the flat surface 202.

For example, the second width (W2) of the inclined plane 201 may be larger than the third width (W3) of the flat surface 202.

Figure 4A:
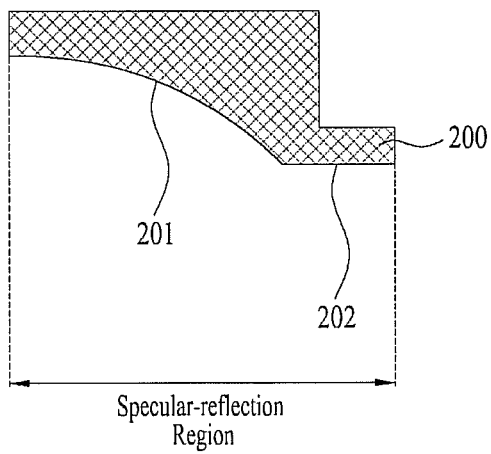
FIGS. 4A to 4C are sectional views illustrating the first reflector including a specular-reflection region.
Figure 4B:
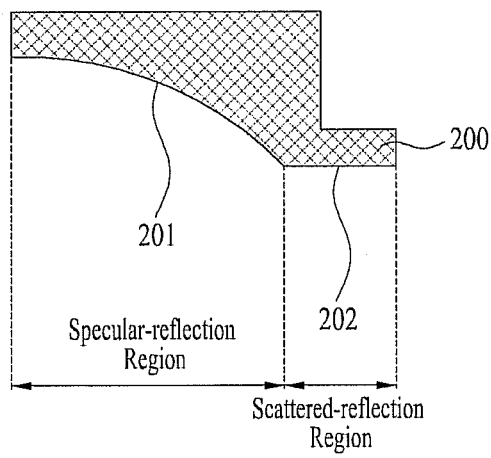
Figure 4C:
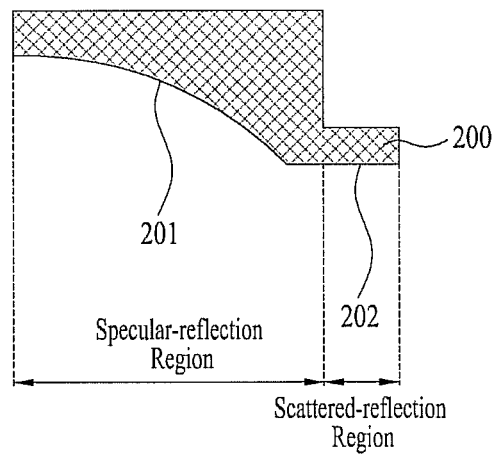

FIGS. 4A to 4C are sectional views illustrating the first reflector that includes a specular-reflection region.

As shown in FIGS. 4A to 4C, the back surface of the first reflector 200 may include a specular-reflection region to specular-reflect the light or a scattered-reflection region to scattered-reflect the light.

In case of FIG. 4A, the back surface of the first reflector 200 may include an inclined plane 201 and a flat surface 202. Both of the inclined plane 201 and the flat surface 202 may be the specular-reflection regions.

In other words, a specular-reflection sheet may be disposed on the inclined plane 201 and the flat surface 202, to specular-reflect the light.

In case of FIG. 4B, the back surface of the first reflector 200 may include an inclined plane 201 and a flat surface 202. The inclined plane 201 may be the specular-reflection region and the flat surface 202 may be the scattered-region.

In other words, a specular-reflection sheet may be disposed on the inclined plane 201 to specular-reflect the light and a scattered-reflection sheet may be disposed on the flat surface 202 to scattered-reflect the light.

In case of FIG. 4C, the back surface of the first reflector 200 may include an inclined plane 201 and a flat surface 202. The inclined plane 201 may be a specular-reflection region and the flat surface 202 may include a specular-reflection region and a scattered-reflection region.

In other words, a specular-reflection sheet may be disposed on the inclined plane 201 to specular-reflect the light. The specular-reflection sheet may be disposed on a predetermined region of the flat surface 202 and a scattered-reflection sheet may be disposed on the other region to scattered-reflect the light.

Here, the full-reflection sheet disposed on the flat surface 202 may be adjacent to the inclined plane 201 or between specular-reflection sheets.

If the specular-reflection sheet is disposed on the first reflector 200, more lights may be reflected to the second reflector 300. If the scattered-reflection sheet is disposed on the first reflector, the light may be transmitted to a region of the second reflector 300 having low brightness and the low brightness may be compensated.

Figure 5A:
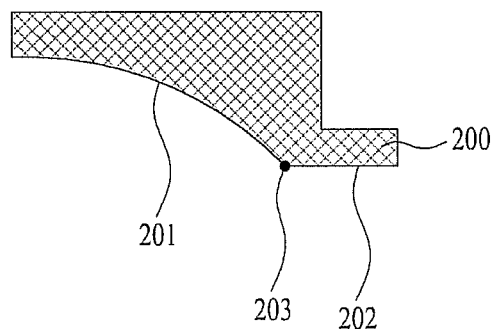
FIGS. 5A and 5B are sectional views illustrating a boundary region between an inclined plane and a flat surface possessed by the first reflector.
Figure 5B:
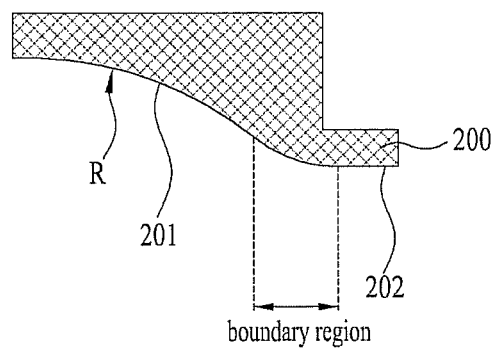

FIGS. 5A and 5B are sectional views illustrating a boundary region between the inclined plane and the flat surface of the first reflector.

As shown in FIG. 5A, the first reflector 200 may include an inclined plane 201 and a flat surface 202 formed on the back surface thereof. A boundary region between the inclined plane 201 and the flat surface 202 may have a dihedral angle formed by them.

However, as shown in FIG. 5B, the boundary region between the inclined plane 201 and the flat surface 202 may include a convex surface with a predetermined curvature.

The reason why the boundary region between the inclined plane 201 and the flat surface 202 is the convex surface with the curvature is following. If the dihedral angle is formed in the boundary region between the inclined plane 201 and the flat surface 202, the incident light might be concentrated only on some region and overall brightness might fail to be uniform.

Because of that, the boundary region between the inclined plane 201 and the flat surface 202 may be formed to be a convex surface with a predetermined curvature and uniform brightness may be provided.

Figure 6A:
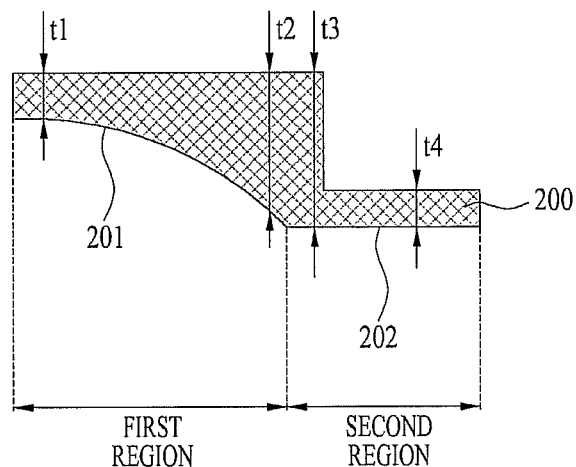
FIGS. 6A and 6B are sectional views illustrating the thickness of the first reflector.
Figure 6B:
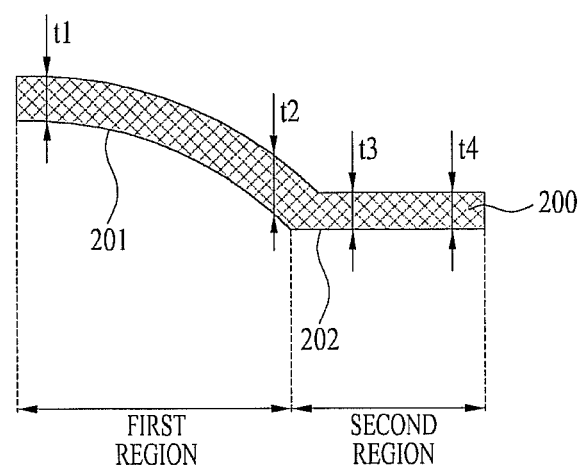

FIGS. 6A and 6B are sectional views illustrating the thickness of the first reflector.

First of all, as shown in FIG. 6A, the first reflector 200 may include a first region adjacent to the light source module and a second region adjacent to the first region.

Here, a back surface of the first region disposed in the first reflector 200 may have an inclined plane 201 and a top surface of the first region may have a flat surface.

Here, a flat surface formed in a top surface of the second region may be in parallel to a flat surface formed in a back surface of the second region.

At this time, in the first region, the thickness (t1) of a predetermined area adjacent to the light source module may be smaller than the thickness (t2) of an area distant from the light source module.

In the second region, the thickness of a predetermined area adjacent to the light source module may be larger than the thickness (t4) of an area distant from the light source module.

Also, in the top surface of the first reflector 200, the first region may be a flat surface and the second region may be a stepped surface having two flat surfaces with different heights.

As shown in FIG. 6B, the first reflector 200 may include a first region adjacent to the light source module and a second region adjacent to the first region.

Here, a back surface of the first region disposed in the first reflector 200 may have an inclined plane 201 and a top surface of the first region may have an inclined plane.

In other words, the back and top surfaces of the first region may have the same inclined planes, respectively.

A back surface of the second region disposed in the first reflector 200 may have a flat surface 202 and a top surface of the second region may have a flat surface.

Here, the top surface of the second region may partially have an inclined plane and the flat surface of the top surface may be in parallel to the flat surface of the back surface.

At this time, in the first region, the thickness (t1) of an area adjacent to the light source module may be the same as the thickness (t2) of an area distant from the light source module.

In the second region, the thickness (t3) of an area adjacent to the light source module may be the same as the thickness (t4) distant from the light source module.

Also, in the top surface of the first reflector, the first region may be an inclined plane and the second region may be combined with an inclined plane and a flat surface.

Figure 7A:
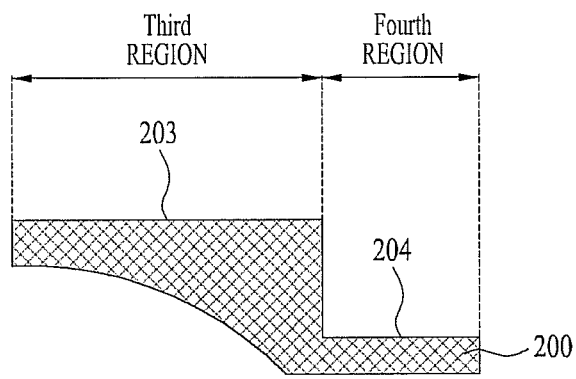
FIGS. 7A and 7B are sectional views illustrating the width of an upper surface possessed by the first reflector.
Figure 7B:
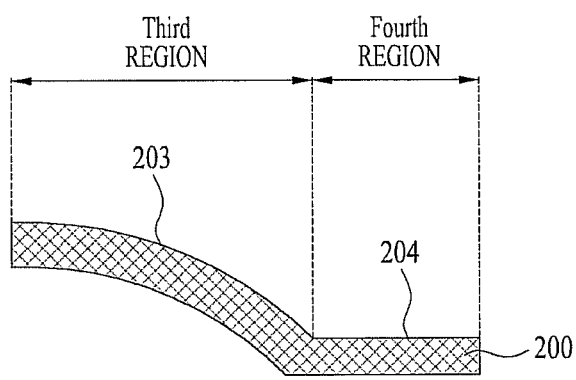

FIGS. 7A and 7B are sectional views illustrating the width of the top surface of the first reflector.

First of all, as shown in FIG. 7A, the top surface of the first reflector 200 may include a third region 203 adjacent to the light source module and a fourth region 204 adjacent to the third region 203.

Here, the third region 203 disposed in the top surface of the first reflector 200 may be corresponding to the inclined plane disposed in the back surface of the first reflector 200 and the fourth region 204 disposed in the top surface of the first reflector 200 may be corresponding to the flat surface disposed in the back surface of the first reflector 200.

Here, the third region 203 and the fourth region 204 may be flat surfaces located on different lines.

In other words, the flat surface of the third region 203 may be higher than the flat surface of the fourth region 204.

The width of the third region 203 may be different from the width of the fourth region 204.

That is, the width of the flat surface formed in the third region 203 may be different from the width of the flat surface disposed in the fourth region 204. For example, the width of the flat surface disposed in the third region 203 may be larger than the width of the flat surface disposed in the fourth region 204.

That is because an active region of the display can be increased by reducing the width of the fourth region 204 and by reducing the width of the bezel accordingly.

In some case, the widths of the third and fourth regions 203 and 204 may be the same.

As shown in FIG. 7B, the top surface of the first reflector 200 may include a third region 203 adjacent to the light source module and a fourth region 204 adjacent to the third region 203.

Here, the third region 203 disposed in the top surface of the first reflector 200 may be corresponding to the inclined plane disposed in the back surface of the first reflector 200 and the fourth region 204 disposed in the top surface of the first reflector 200 may be corresponding to the flat surface disposed in the back surface of the first reflector 200.

Here, the third region 203 may be a downwardly inclined plane and the fourth region 204 may be a flat surface in parallel to the back surface.

The width of the third region 203 may be different from the width of the fourth region 204.

In other words, the width of the flat surface disposed in the third region 203 may be different from the width of the flat surface disposed in the fourth region 204.

That is because an active region of the display can be increased by reducing the width of the fourth region 204 and by reducing the width of the bezel accordingly.

In some cases, the widths of the third and fourth regions 203 and 204 may be the same.

The third region 203 and the fourth region 204 disposed in the top surface of the first reflector 200 may have the surfaces having the same appearance. Alternatively, they may have surfaces having different appearances, respectively.

The surfaces of the third and fourth regions 203 and 204 may be curved or flat and they may be fabricated in various shapes rather than the curved or flat shapes.

Figure 8A:
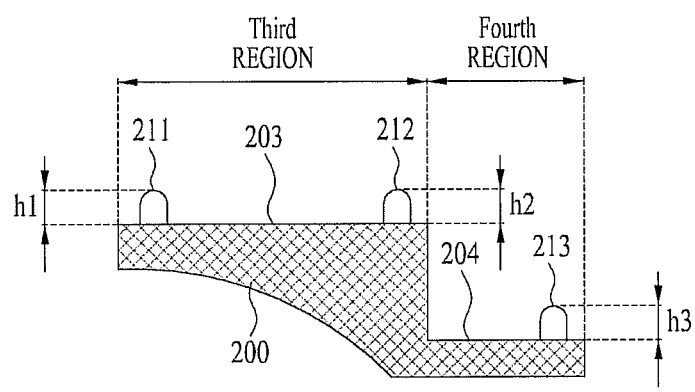
FIGS. 8A and 8B are sectional views illustrating a projection projected from the upper surface of the first reflector.
Figure 8B:
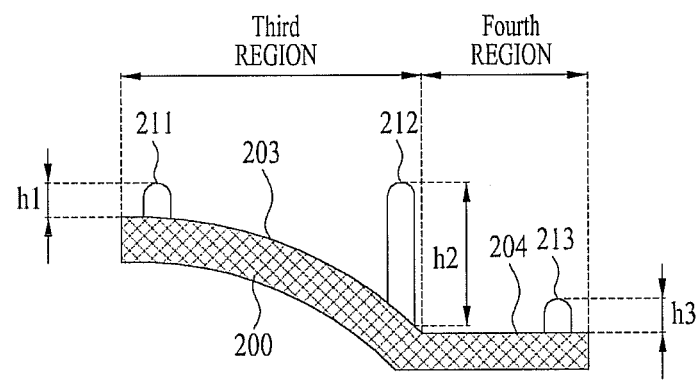

FIGS. 8A and 8B are sectional views illustrating a projection projected from the top surface of the first reflector.

As shown in FIGS. 8A and 8B, the top surface of the first reflector 200 may include at least one projection projected with a predetermined height.

In an embodiment shown in FIG. 8A, the top surface of the first reflector 200 may include a third region 203 adjacent to the light source module and a fourth region 204 adjacent to the third region 203. The third and fourth regions 203 and 204 may have flat surfaces located on a different line, respectively.

Here, a first projection 211 and a second projection 212 may be disposed on the flat surface of the third region 203. A third projection 213 may be disposed on the flat surface of the fourth region 204.

At this time, the height (h1) of the first projection 211, the height (h2) of the second projection 212 and the height (h3) of the third projection 213 may be the same. In some cases, at least one of the heights (h1, h2 and h3) possessed by the first, second and third projections 211, 212 and 213, respectively, may be the same. Alternatively, at least one of the heights (h1, h2 and h3) possessed by the first, second and third projections 211, 212 and 213, respectively, may be different from the others.

In an embodiment shown in FIG. 8B, the top surface of the first reflector 200 may include a third region 203 adjacent a fourth region 204 adjacent to the third region 203. The third and fourth regions 203 and 204 may have flat surfaces located on a different line, respectively.

Here, a first projection 211 and a second projection 212 may be disposed on the flat surface of the third region 203. A third projection 213 may be disposed on the flat surface of the fourth region 204.

At this time, the height (h1) of the first projection 211, the height (h2) of the second projection 212 and the height (h3) of the third projection 213 may be the same. In some cases, at least one of the heights (h1, h2 and h3) possessed by the first, second and third projections 211, 212 and 213, respectively, may be the same. Alternatively, at least one of the heights (h1, h2 and h3) possessed by the first, second and third projections 211, 212 and 213, respectively, may be different from the others.

Although not shown in the drawings, the first, second and third projections 211, 212 and 213 may be employed to support or couple optical members or panel guide molds.

For example, the first and second projections 211 and 212 may be members configured to be coupled with a panel guide mold to fix or support the display panel. The third projection 213 may be a member to support the optical members.

Here, a top surface of the third projection may be a convex surface with a predetermined curvature to reduce the contact area with the optical members. As a result, the optical member may be protected from an external shock.

In some cases, a plurality of hollownesses or minute projections may be further formed in the top surface of the third projection 213.

FIGS. 9A to 9D are sectional views illustrating a reflection pattern formed in the first reflector.

As shown in FIGS. 9A to 9D, the first reflector 200 may include the inclined plane 201 and the flat surface 202 formed in the back surface thereof. A plurality of reflection patterns 215 may be formed on the flat surface 202.

Figure 9A:
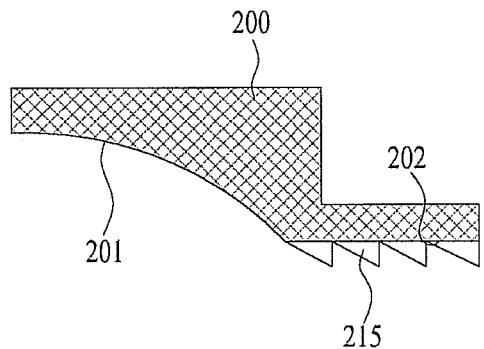
FIGS. 9A to 9D are sectional views illustrating a reflection pattern formed in the first reflector.
Figure 9B:
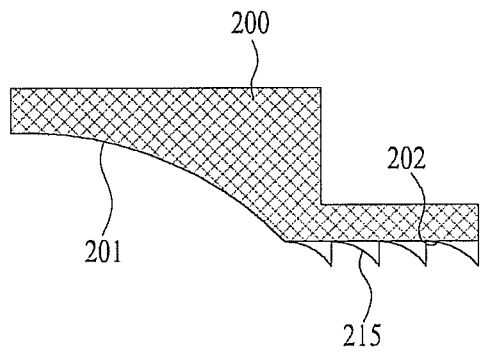
Figure 9C:
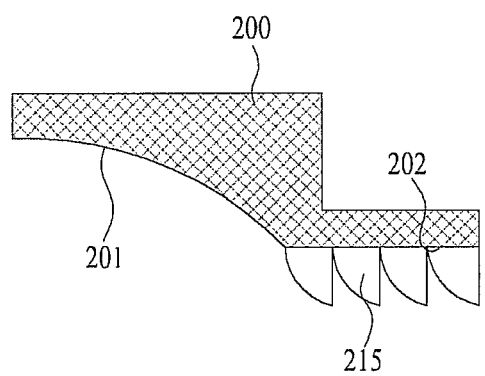
Figure 9D:
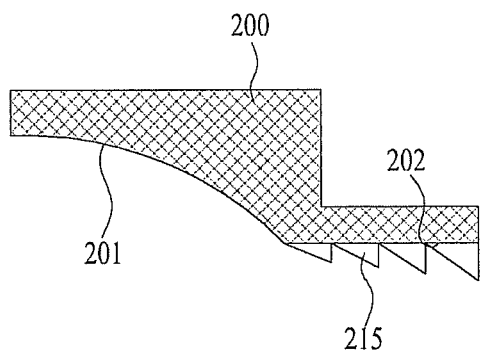

In FIG. 9A, the reflection pattern 215 may be saw-toothed and a surface of the reflection pattern 215 may be flat. In FIGS. 9B and 9C, the reflection pattern 215 may be saw-toothed and the surface of the reflection pattern 215 may be curved.

Here, in FIG. 9B, the surface of the reflection pattern 215 may be concavely curved and in FIG. 9C, the surface of the reflection pattern 215 may be convexly curved.

In some cases, as shown in FIG. 9C, the size of the reflection patterns 215 may be getting larger from an end of the first reflector 200 toward the other end thereof.

In other words, the size of the reflection pattern 215 may not be uniform. The size of a reflection pattern 215 close to the light source module may be larger than the size of another reflection pattern 215 distant from the light source module.

The reason why the reflection patterns 215 are formed on the flat surface of the first reflector 200 is that uniform brightness can be provided by compensating brightness after reflecting the light toward the region having relatively low brightness, compared with the other region.

As a result, such the reflection patterns 215 may be fabricated in corresponding regions, with various sizes according to the entire brightness distribution of the backlight.

Figure 10A:
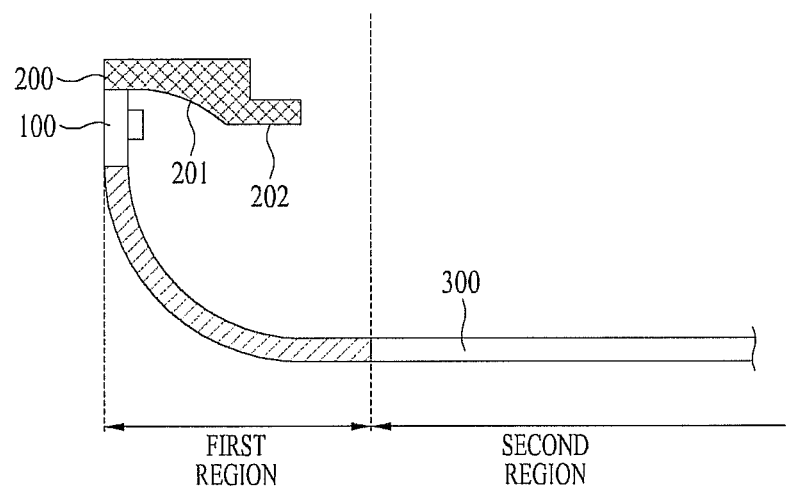
FIGS. 10A to 10C are sectional views illustrating the length of the first reflector.
Figure 10B:
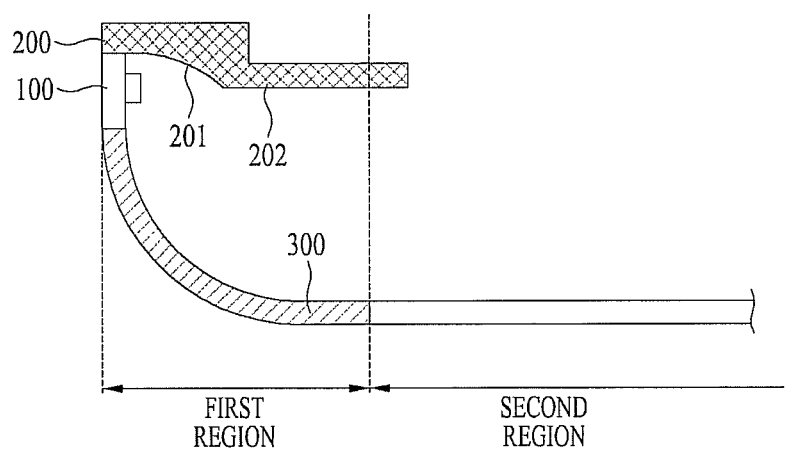
Figure 10C:
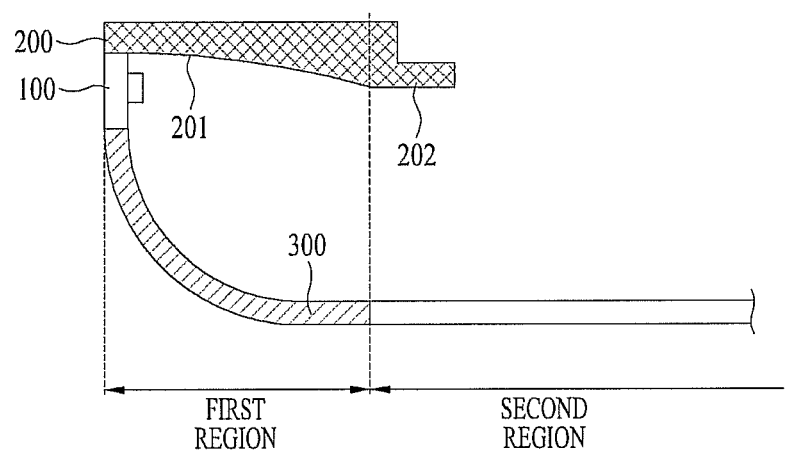

FIGS. 10A to 10C are sectional views illustrating the length of the first reflector.

As shown in FIGS. 10A to 10C, the second reflector 300 may include a first region adjacent to the light source module 100 and a second region adjacent to the third region.

The first region of the second reflector 300 may be aligned with the light source module 100 and the first reflector and it may have a first inclined plane inclined downwardly.

The second region of the second reflector 300 may be a flat surface in parallel to the flat surface disposed in the back surface of the first reflector or it may include a second inclined plane inclined upwardly.

The back surface of the first reflector 200 may include an inclined plane 201 adjacent to the light source module 100 and a flat surface 202 adjacent to the inclined plane 201. The flat surface 202 disposed in the back surface of the first reflector 200 may be aligned in at least one of the first and second regions disposed in the second reflector 300.

FIG. 10A illustrates an embodiment in that the flat surface 202 disposed in the back surface of the first reflector 200 is aligned in the first region of the second reflector 300. FIG. 10B illustrates an embodiment in that the flat surface 202 disposed in the back surface of the first reflector 200 is aligned over the first region and the second region. FIG. 10C illustrates an embodiment in that the flat surface 202 disposed in the back surface of the first reflector 200 is aligned in the second region of the second reflector 300.

As mentioned above, the length of the first reflector 200 may be variable according to various embodiments.

FIGS. 11A to 11D are sectional views illustrating an arrangement relation between the light source module and the first and second reflectors.

Figure 11A:
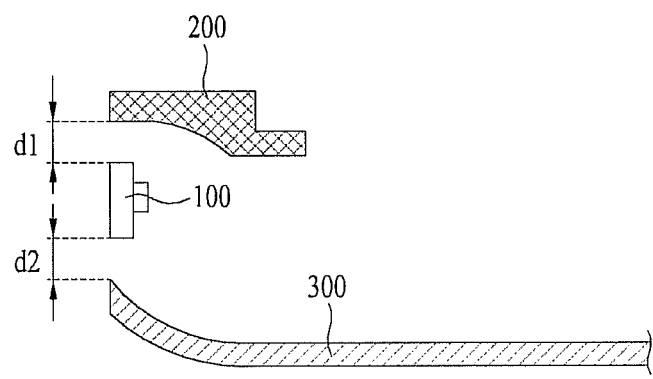
FIGS. 11A to 11D are sectional views to explain an arrangement relation between a light source module and each of first and second reflectors.
Figure 11B:
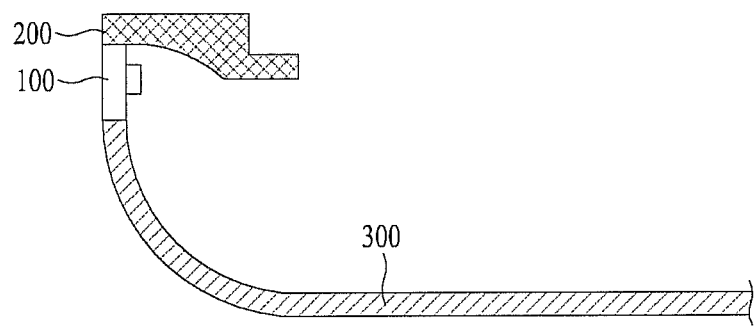
Figure 11C:
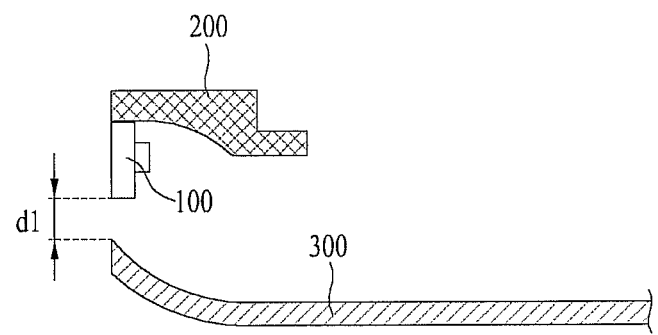
Figure 11D:
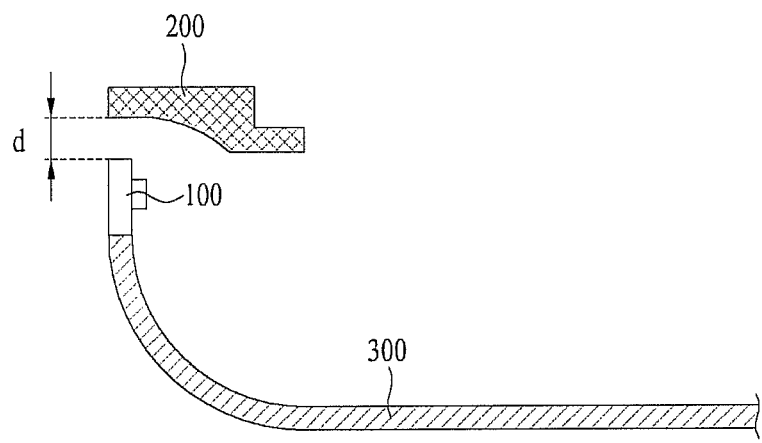

FIG. 11A illustrates the light source module 100 spaced apart a predetermined distance from the first and second reflectors 200 and 300. FIG. 11B illustrates the light source module 100 in contact with the first and second reflectors 200 and 300 simultaneously. FIG. 11C illustrates the light source module 100 spaced apart a predetermined distance from the second reflector 300, in contact with the first reflector 200 simultaneously. FIG. 11D illustrates the light source module 100 spaced apart a predetermined distance from the first reflector 200, in contact with the second reflector 300 simultaneously.

As shown in FIG. 11A, the light source module 100 may be spaced apart a first distance (d1) from the first reflector 200 and a second distance (d2) from the second reflector 300.

Here, the first distance (d1) and the second distance (d2) may be the same or different from each other.

For example, the first distance (d1) may be smaller than the second distance (d2).

If the first distance (d1) is larger than the second distance (d2), a hot spot may be generated.

As shown in FIG. 11B, the light source module 100 may be in contact with the first reflector 200 and the second reflector 300.

Here, the light source module 100 may be in contact with the first and second reflectors 200 and 300, to prevent the hot spot and to transfer the light to a region distant from the light source 100 to reduce the overall thickness of the backlight unit.

As shown in FIG. 11C, the light source module 100 may be in contact with the first reflector 200 and it may be spaced apart a predetermined distance (d) from the second reflector 300.

Here, the light source module 100 may be in contact with the first reflector 200, to prevent the hot spot and to transfer the light to a region distance from the light source module 100.

As shown in FIG. 11D, the light source module 100 may be in contact with the second reflector 300 and it may be spaced apart a predetermined distance (d) from the first reflector 200.

Figure 12A:
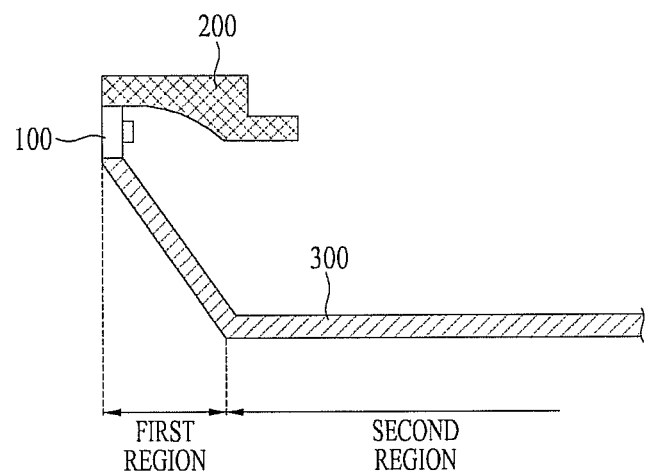
FIGS. 12A to 12C are sectional views illustrating a second reflector including a slope side and a flat surface.
Figure 12B:
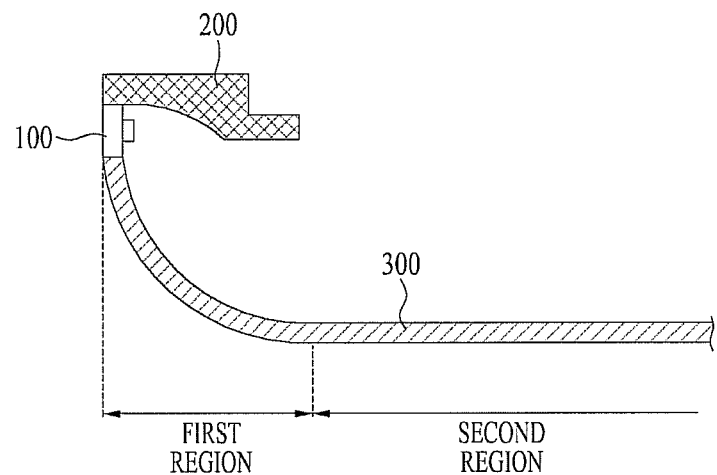
Figure 12C:
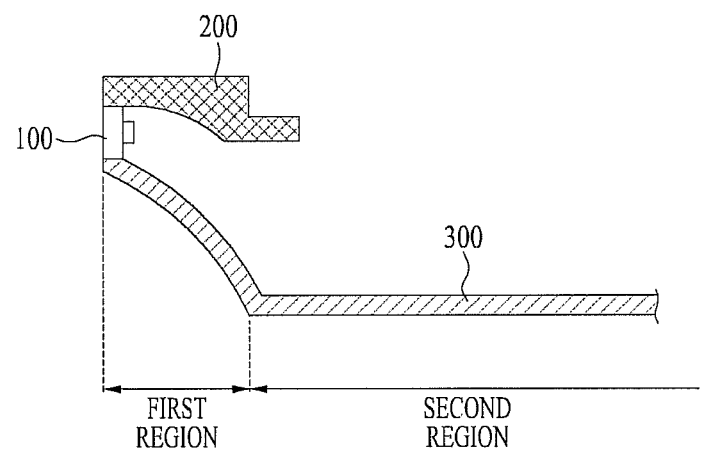

FIGS. 12A to 12C are sectional views illustrating the second reflector including the inclined plane and the flat surface.

FIG. 12A illustrates the inclined plane of the second reflector 300 is flat and FIG. 12B illustrates the inclined plane of the second reflector 300 is concavely curved. FIG. 12C illustrates the inclined plane of the second reflector 300 is convexly curved.

Here, a first region of the second reflector 300 may be the inclined plane and a second region may be the flat surface.

Figure 13A:
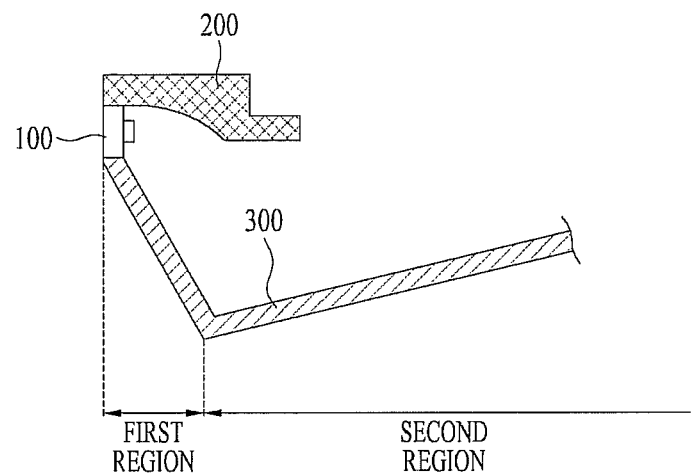
FIGS. 13A to 13C are sectional views illustrating a second reflector including a plurality of inclined planes.
Figure 13B:
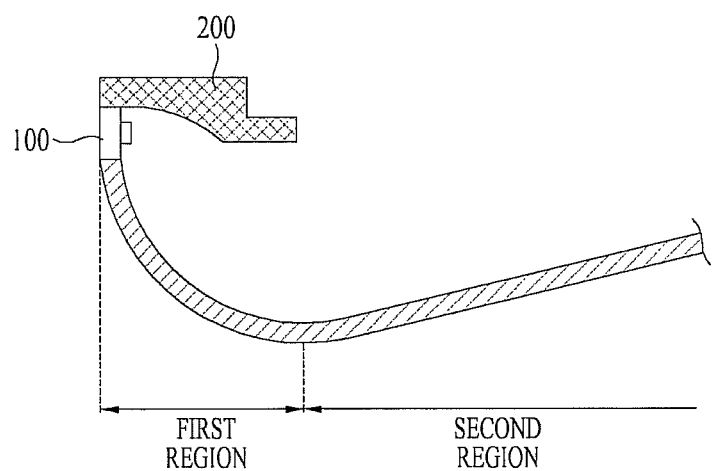
Figure 13C:
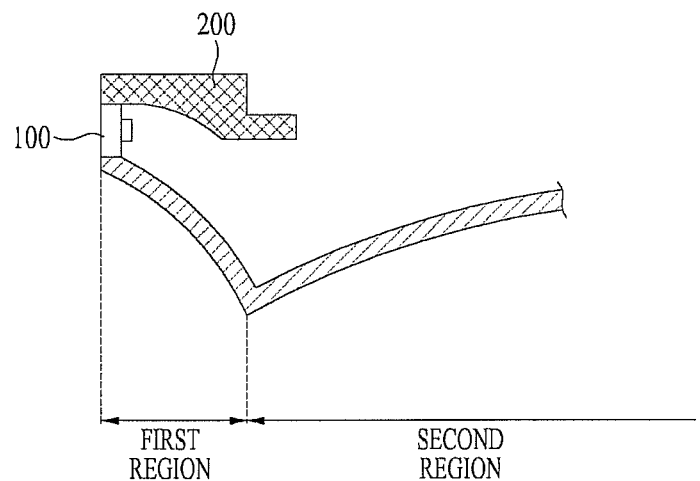

FIGS. 13A to 13C are sectional views illustrating the second reflector including a plurality of inclined planes.

In FIG. 13A, two neighboring inclined planes have flat surfaces, respectively. In FIG. 13B, two neighboring inclined planes have concavely curved surfaces and the curvatures of the two inclined planes may be different from each other. In FIG. 13C, two neighboring inclined planes may have convex curved surfaces and the curvatures of the two inclined planes may be different from each other.

As shown in FIGS. 13A to 13C, the second reflector 300 may include a first region adjacent to the light source 100 and a second region distant from the light source module 100.

Here, the first region and the second region of the second reflector 300 may be inclined planes.

In the meanwhile, a specular-reflection sheet may be formed on the first region of the second reflector 300 to specular-reflect the light. At least one of the specular-reflection sheet and scattered-reflection sheet may be formed on the second region of the second reflector 300.

Here, the reason why the specular-reflection sheet is formed on the first region of the second reflector 300 is that uniform brightness can be provided by reflecting more light toward the central region of the second reflector 300 having lower brightness.

Also, the reason why the scattered-reflection sheet is formed on the second region of the second reflector 300 is that the lower brightness can be compensated by scattered-reflecting the light in the second region of the second reflector 300 having the lower brightness.

The second reflector 300 may include a metal material or a metal oxide with a high reflectivity such as Al, Ag, Au and TiO2. The materials forming the first and second regions of the second reflector 300 may be different from each other and surface roughness of the first region may be different from surface roughness of the second region.

In other words, the first and second regions of the second reflector 300 may be formed of the same materials, with a different surface roughness.

Alternatively, the first and second regions of the second reflector 300 may be formed of different materials, and surface roughness of them may be different from each other simultaneously.

In the meanwhile, the second reflector 300 may be a reflection coating film or a reflection coating material layer having a reflection material deposited thereon.

The second reflector 300 may include at least one of a metal material and a metal oxide. For example, the second reflector 300 may include a metal material or a metal oxide with a high reflectivity such as Al, Ag, Au and TiO2.

In this case, the second reflector 300 may be formed by depositing or coating the metal material or the metal oxide on a polymer resin frame 430 that is a bottom plate or it may be formed by printing metal ink.

Here, the depositing method may be thermal deposition, vapor deposition or vacuum deposition such as sputtering. The coating or printing method may be printing, gravure printing or silk printing.

In addition, the second reflector 300 may be a film or sheet and it may be bonded on the polymer resin frame.

Here, the second reflector 300 may have the structure having a unilayer with the uniform reflectivity formed on an entire region of the polymer resin frame that is the bottom plate. The second reflector 300 may have the structure having multi-layers with different reflectivity, respectively, formed on the entire region of the polymer resin frame.

The reason why the second reflector 300 includes the multi-layers with the different reflectivity is that the overall brightness of the backlight might fail to be uniform because the light reflectivity of the overall reflection surface is not uniform in case of forming only the reflection layer having the same reflectivity.

As a result, a reflection layer with a relatively high reflectivity may be formed on a region with a high brightness in the reflection surface or a reflection layer with a relatively low reflectivity may be formed on a region with a higher brightness in the reflection surface. Because of that, the overall brightness of the backlight may be compensated uniformly.

Figure 14:
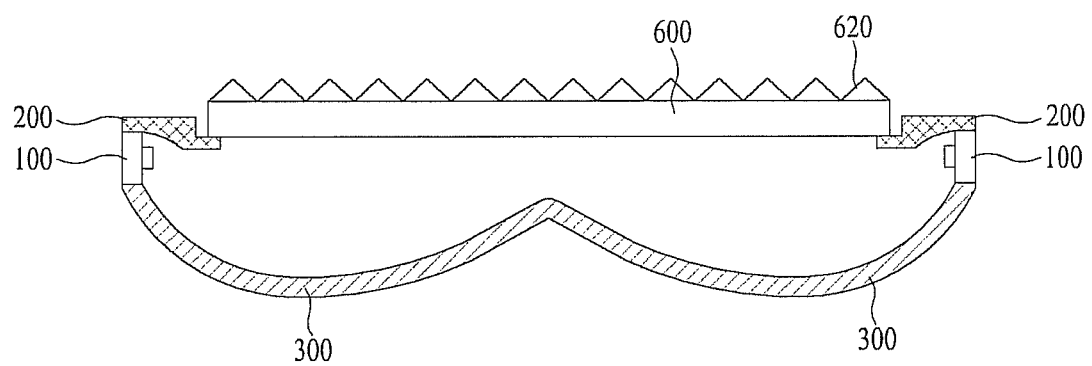
FIG. 14 is a diagram illustrating a backlight unit having optical members disposed therein.

FIG. 14 is a diagram illustrating a backlight unit having an optical member disposed thereon.

As shown in FIG. 14, an optical member 600 may be disposed, spaced apart a predetermined distance from the second reflector 300.

An air guide may be formed in the space between the second reflector 300 and the optical member 600.

Here, an unevenness pattern 620 may be formed on a top surface of the optical member 600.

The optical member 600 may be configured to disperse the light emitted from the light source module 100 and the unevenness pattern 620 may be formed to increase a dispersion effect.

In other words, the optical member 600 may be configured of a plurality of layers and the unevenness pattern 620 may be disposed on the uppermost layer or a surface of one of the layers.

The unevenness pattern 620 may have a strip shape disposed along the light source module 100.

At this time, the unevenness pattern 620 may include projected portions projected from the surface of the optical member 600 and each of the projected portions may be configured of a first surface and a second surface facing each other. An angle formed between the first surface and the second surface may be an acute angle or an obtuse angle.

In some cases, the optical member 600 may be configured of at least one sheet and it may selectively include a diffusion sheet, a prism sheet or a brightness enhancement sheet.

Here, the diffusion sheet may diffuse the light emitted from the light source and the prism sheet may guide the diffused light toward a luminescence region. The brightness enhancement sheet may enhance brightness.

Furthermore, the second reflector 300 may include at least one of a metal material and a metal oxide. For example, the second reflector 300 may include a metal material or metal oxide with a high reflectivity such as al, Ag, Au or TiO2.

Also, the second reflector 300 may be formed of a reflection coating film or a reflection coating material layer and it may be employed to reflect the light generated in the light source module 100 toward the optical member 600.

The second reflector 300 may have a saw-toothed reflection pattern formed on a surface thereof facing the optical member 600. The reflection pattern may be a flat surface or a curved surface.

The reason why the reflection pattern is formed on the surface of the second reflector 300 is that the light generated in the light source module 100 can be diffused and reflected uniformly.

According to the embodiments, the reflector for air guiding may include the flat surface or the inclined plane. Because of that, the weight of the backlight unit may be reduced and the fabricating cost of the backlight unit may be lowered. Also, the backlight unit may provide uniform brightness.

As a result, the economic feasibility and reliability of the backlight unit may be enhanced.

Figure 15:
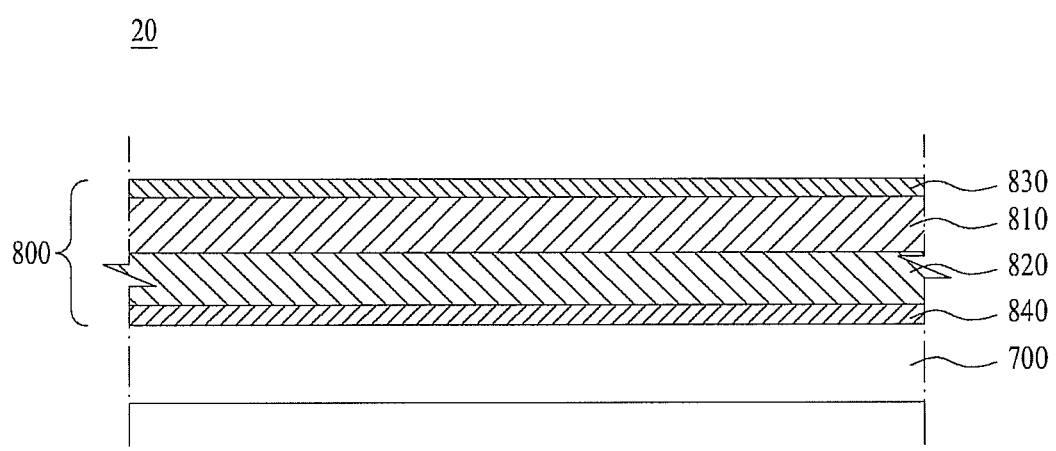
FIG. 15 is a diagram illustrating a display module including the backlight unit according to the embodiment.

FIG. 15 is a diagram illustrating a display module including the backlight unit according to the embodiments mentioned above.

As shown in FIG. 15, a display module 20 may include a display panel 800 and a backlight unit 700.

The display panel 800 may include a color filter substrate 810 and a thin film transistor substrate 820 (TFT) that are bonded to maintain a uniform cell gap, facing each other. A liquid crystal layer (not shown) may be disposed between the two substrates 810 and 820.

A top polarization plate 830 and a bottom polarization plate 840 may be disposed on and under the display panel 800, respectively. More specifically, the top polarization plate 830 may be disposed on a top surface of the color substrate 810 and the bottom polarization plate 840 may be disposed under the TFT substrate 820.

Although not shown in the drawings, gate and data driving parts may be disposed in both sides next to the display panel 800 to generate a driving signal used to drive the panel 800.

Figure 16:
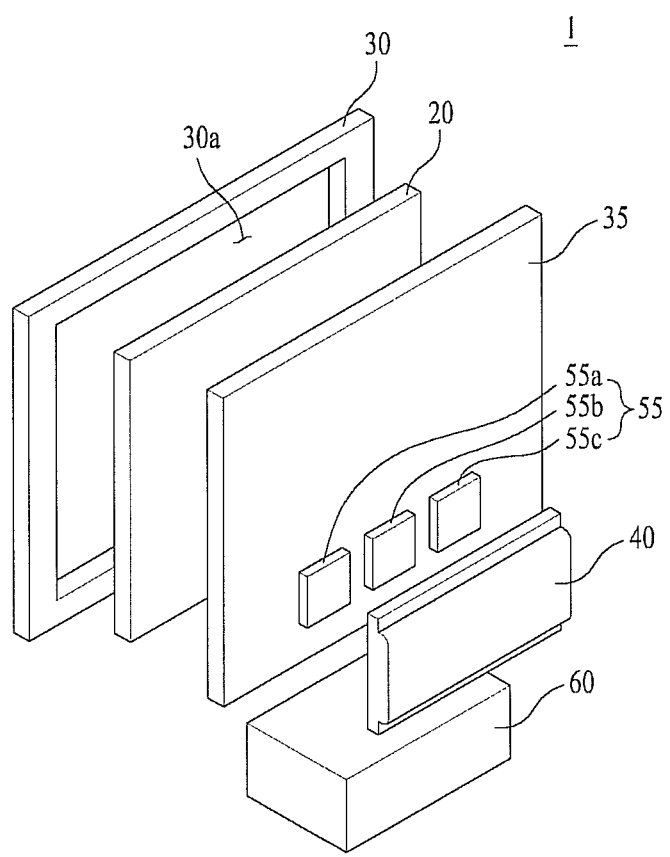
FIGS. 16 and 17 are diagrams illustrating a display device according to an embodiment.
Figure 17:
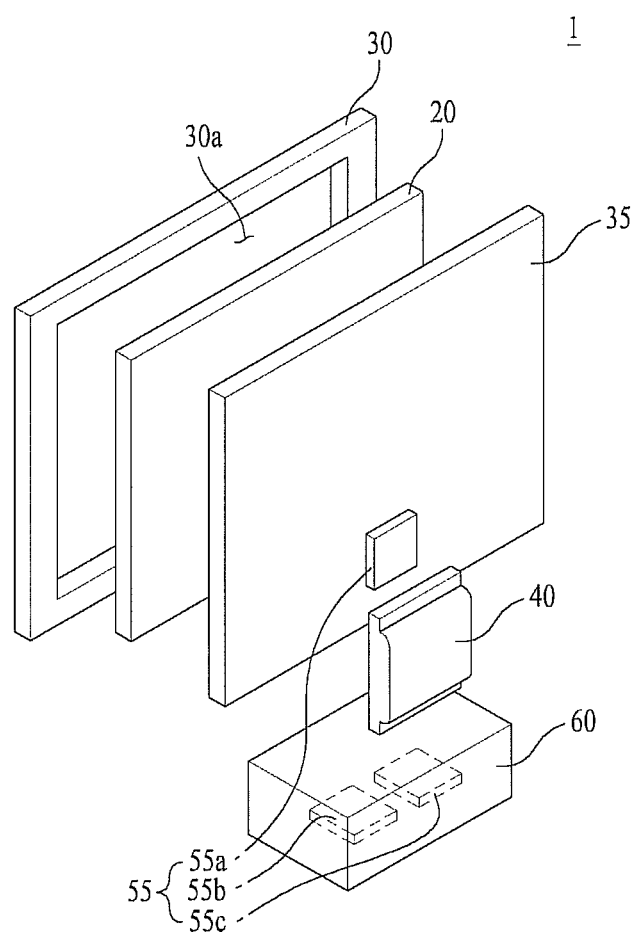

FIGS. 16 and 17 are diagrams illustrating a display device according to an embodiment.

In reference to FIG. 16, a display device 1 may include a display module 20, a front cover 30 and a back cover 35 surrounding the display module 20, a driving part 55 disposed in the back cover 35 and a driving cover 40 surrounding the driving part 55.

The front cover 30 may include a front panel (not shown) formed of a transparent material to transmit light. The front panel may protect the display module 20, spaced apart a predetermined distance from the display module 20, and transmit the light emitted from the display module 20 to enable an image displayed on the display module 20 visible outside.

The back cover 35 may be coupled to the front cover 30, to protect the display module 20.

The driving part 55 may be disposed on a surface of the back cover 35.

The driving part 55 may include a main control part 55*a*, a main board 55*b* and a power supply part 55*c*.

The driving control part 55*a* may be a timing controller and it may be driving part that adjusts an operation timing of each driver IC disposed in the display module 20. The main board 55*b* may be a driving part that transmits V-synch, H-synch and R, G and B resolution signals to the timing controller. The power supply part 55*c* may be a driving part that applies an electric voltage to the display module 20.

The driving part 55 may be disposed in the back cover 35 and it may be surrounded by the driving part cover 40.

A plurality of holes may be disposed in the back cover 35, to connect the display module 20 and the driving part 55 with each other. A stand 60 may be disposed in the back cover 35 to support the display device 1.

In contrast, as shown in FIG. 17, a driving control part 55*a* of the driving part may be disposed in the back cover 35 and the power board 55*c* of the main board 55*b* may be disposed in the stand 60.

The driving part cover 40 may cover only the driving part 55 disposed in the back cover 35.

In this embodiment, the main board 55*b* and the power board 55*c* may be independently disposed or they may compose a single integration board, and this embodiment is not be limited thereto.

Another embodiment may be a display device, a pointing device or a lighting system that includes the first and second reflectors and the light source module described in the embodiments. For example, the lighting system may include a lamp and a streetlamp.

Such the lighting system may be used as a lighting lamp having a plurality of light emitting diodes focused thereon to generate light. Especially, the lighting system may be used as a downlight mounted in a ceiling or wall of a building, with exposing an open portion of a shade.

The embodiments described above may include the reflector for air guide that includes the inclined plane partially, without a light guide plate. The weight of the display device may be reduced and the fabrication cost of the display device may be lowered. Also, the uniform brightness may be provided.

As a result, the economic feasibility and reliability of the backlight unit may be enhanced.

Accordingly, the embodiments may provide a backlight unit and a display device using the same.

In one embodiment, a backlight unit includes a first reflector; a second reflector; and at least one light source module disposed between the first and second reflectors, wherein a back surface of the first reflector may include an inclined plane and a flat surface, with facing the second reflector, and the inclined plane may be adjacent to the light source and the flat surface is extended from an end of the inclined plane, with the inclined plane and the flat surface being collinear.

The inclined plane of the first reflector may be inclined a predetermined angle toward the second reflector and the flat surface of the first reflector is in parallel to the top surface of the first reflector.

The inclined plane of the first reflector may be at least one of a concavely curved surface, a convexly curved surface and a flat surface.

The light source module may include a substrate, at least one light source disposed on the substrate, and the flat surface of the first reflector may be located in a range of the width of the first reflector.

The width of the inclined plane may be the same as or different from the width of the flat surface.

The inclined plane and the flat surface may be specular-reflection regions configured to reflect the light. Or, the inclined plane may be a specular-reflection region configured to specular-reflect the light and the flat surface may be a scattered-reflection region configured to scattered-reflect the light. Or, the inclined plane may be a specular-reflection region and the flat surface may include the specular-reflection region and a scattered-reflection region configured to scattered-reflect the light.

A boundary region between the inclined plane and the flat surface may be a curved surface or includes a dihedral angle.

The first reflector may include a first region having the inclined plane; and a second region having the flat surface, and the thickness of a region adjacent to the light source module may be smaller than the thickness of a region distant from the light source module in the first region, or the thickness of the region adjacent to the light source module may be the same as the thickness of the region distant from the light source module in the first region.

The first reflector may include a first region having the inclined plane; and a second region having the flat surface, and the thickness of a region adjacent to the light source module in the second region may be larger than the thickness of a region distant from the light source module, or the thickness of the region adjacent to the light source module may be the same as the thickness of the region distant from the light source module in the second region.

A top surface of the first reflector may include a third region corresponding to an inclined plane disposed in a back surface of the first reflector; and a fourth region corresponding to a flat surface disposed in a back surface of the first reflector, and the third region and the fourth region may not be collinear.

Here, the width of the third region may be different from the width of the fourth region. A surface of the third region and a surface of the fourth region may be curved or flat.

A reflection pattern may be formed on the flat surface disposed in the back surface of the first reflector.

Here, the reflection pattern may be saw-toothed and a surface of the reflection pattern is at least one of a flat surface, a concavely curved surface and a convexly curved surface. The size of the reflection pattern may be irregular.

The size of the reflection pattern located adjacent to the light source module may be larger than the size of the reflection pattern located distant from the light source module.

The second reflector may include a first region and a second region, and the first region may be aligned with the light source module and the first reflector and the first region is a first inclined plane inclined downwardly, and the second region may be a flat surface in parallel to a flat surface disposed in a back surface of the first reflector or a second inclined plane inclined upwardly.

Here, the flat surface disposed in the back surface of the first reflector may be aligned in at least one of the first and second regions disposed in the second reflector.

The backlight unit may further include an optical member disposed apart a predetermined distance from the second reflector, wherein air guide may be formed in a space formed between the second reflector and the optical member.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
a first reflector;
a second reflector; and
at least one light source module disposed between the first and second reflectors,
wherein a surface of the first reflector comprises an inclined plane and a flat surface, with facing the second reflector, the inclined plane is adjacent to the light source module, and the flat surface is extended from an end of the inclined plane, the second reflector comprises a first region and a second region, the first region is aligned with the light source module and the first reflector and the first region is a first inclined plane inclined downwardly, and the second region is a flat surface in parallel to a flat surface disposed in a back surface of the first reflector or a second inclined plane inclined upwardly.

2. The lighting system according to claim 1, wherein a top surface of the first reflector comprises a third region corresponding to an inclined plane disposed in a back surface of the first reflector and a fourth region corresponding to a flat surface disposed in a back surface of the first reflector, and the third region and the fourth region include at least one projection respectively.

3. The lighting system according to claim 2, wherein the at least one projection supports or couples optical members or panel guide molds.

4. The lighting system according to claim 2, further comprising a plurality of hollownesses or minute projections formed in a top surface of the at least one projection.

5. The lighting system according to claim 1, further comprising plurality of reflection patterns formed on the flat surface, the reflection patterns are saw-toothed, and a surface of the reflection patterns is flat, convexly curved, or concavely curved.

6. The lighting system according to claim 5, wherein sizes of the plurality of reflection patterns are un-uniform.

7. The lighting system according to claim 5, wherein a size of the reflection pattern located adjacent to the light source module is larger than the size of the reflection pattern located distant from the light source module.

8. The lighting system according to claim 1, wherein the at least one light source module contacts with the first reflector and the second reflector.

9. The lighting system according to claim 1, wherein at least one of the first inclined plane or the second inclined plane are concavely curved.

10. The lighting system according to claim 1, wherein at least one of the first inclined plane or the second inclined plane are convexly curved.

11. The lighting system according to claim 1, wherein the second reflector includes a metal material or a metal oxide selected from a group consisting of Al, Ag, Au and $TiO_2$.

12. A lighting system comprising:
a first reflector;
a second reflector; and
at least one light source module disposed between the first and second reflectors,
wherein a surface of the first reflector comprises an inclined plane and a flat surface, with facing the second reflector, and
the inclined plane is adjacent to the light source module and the flat surface is extended from an end of the inclined plane, and
at least one of the first reflector and the second reflector is spaced apart from the light source module.

13. The lighting system according to claim 12, wherein the light source module is spaced apart a first distance from the first reflector and a second distance from the second reflector, and the first distance and the second distance is the same or different from each other.

14. The lighting system according to claim 12, wherein the second reflector includes at least two inclined planes with at least one inflection point, and curvatures of the two inclined planes are different.

15. The lighting system according to claim 12, wherein the second reflector includes a first region and a second region, a specular-reflection sheet is formed on the first region, and at least one of the specular-reflection sheet or a scatter-reflection sheet is formed on the second region.

16. The lighting system according to claim 12, further comprising plurality of reflection patterns formed on the flat surface, the reflection patterns are saw-toothed, and a surface of the reflection patterns is flat, convexly curved, or concavely curved.

17. The lighting system according to claim 16, wherein sizes of the plurality of reflection patterns are un-uniform.

18. The lighting system according to claim 16, wherein a size of the reflection pattern located adjacent to the light source module is larger than the size of the reflection pattern located distant from the light source module.

19. The lighting system according to claim 12, wherein the light source module contacts with the first reflector and the second reflector.

20. A lighting system comprising:
a first reflector;
a second reflector; and
at least one light source module disposed between the first and second reflectors,
wherein a surface of the first reflector comprises an inclined plane and a flat surface, with facing the second reflector, and
the inclined plane is adjacent to the light source module and the flat surface is extended from an end of the inclined plane, and the second reflector comprises a first region and a second region,
the first region is aligned with the light source module and the first reflector and the first region is a first inclined plane inclined downwardly,
the second region is a flat surface in parallel to a flat surface disposed in a back surface of the first reflector or a second inclined plane inclined upwardly, and
the light source module is spaced apart a first distance from the first reflector and a second distance from the second reflector, and the first distance and the second distance is the same or different from each other.

* * * * *